(12) United States Patent
Kieffel et al.

(10) Patent No.: US 8,852,466 B2
(45) Date of Patent: Oct. 7, 2014

(54) SWITCHGEAR FOR BREAKING A MEDIUM- OR HIGH-VOLTAGE ELECTRIC CURRENT AND A MANUFACTURING METHOD THEREFOR

(75) Inventors: Yannick Kieffel, Saint Jean de Bournay (FR); Daniel Piccoz, Lucenay (FR); Alain Girodet, Chassieu (FR)

(73) Assignee: Schneider Electric Energy France, Rueil Malmaison (FR)

( * ) Notice: Subject to any disclaimer, the term of this patent is extended or adjusted under 35 U.S.C. 154(b) by 6 days.

(21) Appl. No.: 13/823,354

(22) PCT Filed: Sep. 20, 2011

(86) PCT No.: PCT/EP2011/066351
§ 371 (c)(1),
(2), (4) Date: May 1, 2013

(87) PCT Pub. No.: WO2012/038442
PCT Pub. Date: Mar. 29, 2012

(65) Prior Publication Data
US 2013/0215555 A1    Aug. 22, 2013

(30) Foreign Application Priority Data
Sep. 22, 2010   (FR) ...................................... 10 57603

(51) Int. Cl.
*C09K 5/00* (2006.01)
*H02B 13/055* (2006.01)
*H01H 11/00* (2006.01)

(52) U.S. Cl.
CPC ............. *H02B 13/055* (2013.01); *H01H 11/00* (2013.01)
USPC ............ 252/570; 252/571; 252/572; 361/678

(58) Field of Classification Search
None
See application file for complete search history.

(56) References Cited

U.S. PATENT DOCUMENTS

| 2008/0135817 | A1* | 6/2008 | Luly et al. .................... 252/571 |
| 2010/0320428 | A1 | 12/2010 | Luly et al. |
| 2012/0228264 | A1 | 9/2012 | Piccoz |

FOREIGN PATENT DOCUMENTS

| DE | 20 2009 009 305 U1 | 12/2009 |
| FR | 2 930 019 A1 | 10/2009 |
| WO | WO 2010/146022 A1 | 12/2010 |

OTHER PUBLICATIONS

International Search Report issued Jan. 17, 2012 in Application No. PCT/EP2011/066351.
Preliminary Search Report issued Jan. 17, 2011 in French Application No. 1057603.

* cited by examiner

*Primary Examiner* — Necholus Ogden, Jr.
(74) *Attorney, Agent, or Firm* — Oblon, Spivak, McClelland, Maier & Neustadt, L.L.P.

(57) ABSTRACT

The present invention relates to switchgear for breaking a medium- or high-voltage electric current, which switchgear comprises a leaktight enclosure in which electrical components are found as well as a gaseous medium for extinguishing the electric arcs likely to occur in said enclosure, and which switchgear is characterized in that: the gaseous medium comprises at least one fluoroketone alone or in a mixture with at least one gas that does not form part of the fluoroketone family; the fluoroketone is present in the enclosure in part in the liquid state and in part in the gaseous state; and in that the enclosure further comprises means for absorbing molecular species that form after the ionization experienced by said fluoroketone during arcing. The invention also relates to a method of manufacturing said switchgear.

18 Claims, No Drawings

SWITCHGEAR FOR BREAKING A MEDIUM- OR HIGH-VOLTAGE ELECTRIC CURRENT AND A MANUFACTURING METHOD THEREFOR

CROSS REFERENCE TO RELATED APPLICATIONS

The present application is a 35 U.S.C. §371 national stage patent application of International patent application PCT/EP2011/066351, filed on Sep. 20, 2011, published as WO 2012/038442 on Mar. 29, 2012, the text of which is incorporated by reference, and claims the benefit of the filing date of French application no. 1057603, filed on Sep. 22, 2010, the text of which is also incorporated by reference.

TECHNICAL FIELD

The present invention relates to switchgear for breaking an electric current (also called a connector/disconnector) for medium voltage or high voltage, in which the electric arcs that are likely to occur are extinguished by a gaseous medium that presents extinction properties that are comparable to, or even better than those of sulfur hexafluoride ($SF_6$) while having little or no effect on the environment.

The invention also relates to a method of manufacturing said switchgear.

Above and below, the terms "medium voltage" and "high voltage" are used in the conventionally accepted manner, i.e. the term "medium voltage" refers to a voltage that is greater than 1000 volts (V) for alternating current (AC) or greater than 1500 V for direct current (DC) but that does not exceed 52,000 V for AC or 75,000 V for DC, whereas the term "high voltage" refers to a voltage that is strictly greater than 52,000 V for AC and 75,000 V for DC.

The switchgear for breaking an electric current of the invention may in particular be a circuit breaker, a switch, a unit combining a switch with fuses, a disconnector, a grounding switch, or a contactor.

PRIOR ART

In switchgear for breaking medium- or high-voltage electric currents, current is typically broken by separating electrical contacts and forming an electric arc between said contacts, with a dielectric fluid being blasted onto the arc, thereby making it possible to cool said arc and to extinguish it.

Currently, the dielectric fluid that is used most frequently in switchgear is a gas, namely $SF_6$. That gas presents dielectric strength that is relatively high, good thermal conductivity, and low dielectric losses. In addition, it is chemically inert, non-combustible, non-toxic for humans and animals, and its price is still moderate.

Another advantage lies in the fact that the molecular and ionic species that form when the gas is ionized into the plasma state by an electric arc, recombine quickly and almost completely, once said electric arc has been extinguished, to reform $SF_6$. As a result the quantity of $SF_6$ that is initially present in the gaseous state in switchgear remains stable or quasi-stable over time.

However, $SF_6$ has the main drawback of presenting a global warming potential (GWP) of 23,900 (relative to $CO_2$ over 100 years) and a time period spent in the atmosphere of 3200 years, and for this reason it was included in the Kyoto protocol (1997) in the list of gases for which emissions need to be limited.

Unfortunately, the best way to limit emissions of $SF_6$ is also to limit its use in general and in particular its use in switchgear.

Mixtures of $SF_6$ and nitrogen are used so as to limit the impact of $SF_6$ on the environment. Adding $SF_6$, e.g. at 10% to 20% by volume, makes it possible to improve significantly the dielectric strength of nitrogen which, for AC (50 Hertz (Hz)), is about one-third that of $SF_6$.

Nevertheless, due to the high GWP of $SF_6$, the GWP of those mixtures remains very high. Thus, for example, a mixture of $SF_6$ and nitrogen, having a volume ratio of 10/90, still presents a GWP of 8650.

Such mixtures should therefore not be considered to be gaseous media having a low environmental impact.

The same applies for perfluorocarbons that generally present advantageous dielectric properties but that have GWPs typically lying in the range 5000 to 10,000 (6500 for $CF_4$, 7000 for $C_3F_8$ and $C_4F_{10}$, 8700 for $c$-$C_4F_8$, 9200 for $C_2F_6$).

It has recently been proposed to replace $SF_6$ with trifluoroiodomethane ($CF_3I$) (Nakauchi et al., XVI International Conference on Gas Discharge and their Applications, China, Sep. 11-15, 2006, [1]). $CF_3I$ presents dielectric strength that is greater than that of $SF_6$ and this applies both to uniform fields and non-uniform fields, for a GWP that is less than 5 and a time period spent in the atmosphere of 0.005 year.

Unfortunately, in addition to the fact that $CF_3I$ is expensive, it has an average occupational exposure limit (OEL) lying in the range 3 to 4 parts per million (ppm) and is classified among carcinogenic, mutagenic, and reprotoxic (CMR) category 3 substances, which are unacceptable for use on an industrial scale.

In addition, switchgear in which electric arcs are extinguished using oil presents the main drawback of exploding in the event of non-breaking or internal failure.

Switchgear in which electric arcs are extinguished by ambient air is generally of large dimensions, costly, and sensitive to the environment (moisture, pollution) whereas switchgear, in particular of the switch-disconnector type, having a vacuum circuit breaker is very expensive and, as a result, is not very common on the market.

In view of the above, the inventors have therefore sought to provide switchgear for breaking a medium- or high-voltage electric current, in which the electric arcs likely to occur are extinguished by a dielectric fluid that, while presenting extinction capabilities that are comparable to, or even better than those of $SF_6$, has little or no effect on the environment.

They have also sought to provide a dielectric fluid that is non-toxic for humans and animals.

They have also sought to provide a dielectric fluid that has a cost that is compatible with its use in manufacturing switchgear on an industrial scale.

SUMMARY OF THE INVENTION

These objects and others are achieved by the invention that provides, firstly, switchgear for breaking a medium- or high-voltage electric current, which switchgear comprises a leak-tight enclosure in which electrical components are found as well as a gaseous medium for extinguishing the electric arcs likely to occur in said enclosure, and which switchgear is characterized in that:

the gaseous medium comprises at least one fluoroketone alone or in a mixture with at least one gas that does not form part of the fluoroketone family;

the fluoroketone is present in the enclosure in part in the liquid state and in part in the gaseous state; and in that the enclosure further comprises means for absorbing molecular species that form after the ionization experienced by said fluoroketone during arcing.

In their work, the inventors have found that the fluoroketones, which are not toxic, and which degrade very quickly in the atmosphere because of their sensitivity to ultraviolet rays as presented by the double bond of the ketone group —C=O that they contain and that, as a result, have a GWP close to 1, present particularly advantageous arc-extinguishing properties in the gaseous state and are, as such, very advantageously suitable for replacing $SF_6$ in switchgear for breaking electric currents.

However, they have also found that, after ionizing in the plasma state, the fluoroketones do not present a capacity to reconstitute in a way that is analogous to the capacity presented by the $SF_6$, and consequently, the quantity of fluoroketone(s) that is initially present in the gaseous state inside the switchgear for breaking electric current reduces as the number of breaks performed by said switchgear increases.

Consequently, in order to overcome this additional problem the invention provides:

firstly, placing a "source" of gaseous fluoroketone in the enclosure of the switchgear, said source being represented by the fraction of fluoroketone that is present in the liquid state in said enclosure and that will vaporize in part to form gaseous fluoroketone when the partial pressure of the fraction of fluoroketone that is present in the gaseous state inside the enclosure reduces after the formation of an electric arc as a result of the inability of said fluoroketone to reconstitute once it has been ionized by said electric arc; and secondly, trapping the molecular species that are formed after the fluoroketone has ionized so that the formation of said species does not result in an excessive increase in the total pressure that exists in the enclosure and, therefore, does not result in an excessive reduction of the fraction of fluoroketone that is present in the gaseous state in said enclosure.

According to the invention, the fluoroketone is preferably selected from fluoroketones having a total number of carbon atoms lying in the range 3 to 8, said fluoroketones possibly comprising one or more ketone functions.

Also, the fluoroketone is preferably selected from the fluoroketones that satisfy the empirical formula $C_nF_{2n}O$ in which n is an integer lying in the range 3 to 8.

In practice, said fluoroketones are:

the fluoroketone having the empirical formula $C_3F_6O$ and the semi-structural formula $CF_3$—CO—$CF_3$, which, will more simply be called C3K below;

the fluoroketone having the empirical formula $C_4F_8O$ and the semi-structural formula $CF_3$—CO—$CF_2$—$CF_3$, which, more simply, is called C4K below;

the fluoroketone having the empirical formula $C_5F_{10}O$ and the semi-structural formula $CF_3$—CO—CF—$(CF_3)_2$, which, more simply, is called C5K below;

the fluoroketone having the empirical formula $C_6F_{12}O$ and the semi-structural formula $CF_3$—$CF_2$—CO—CF—$(CF_3)_2$, which, more simply, is called C6K below;

the fluoroketones having the empirical formulae $C_7F_{14}O$ and the semi-structural formula $CF_3$—$CF_2$—$CF_2$—CO—$CF_2$—$CF_2$—$CF_3$, $CF_3$—$CF_2$—$CF_2$—CO—$CF(CF_3)_2$ and $(CF_3)_2$—CF—CO—CF—$(CF_3)_2$, which, more simply, are called C7K below; and the fluoroketones having the empirical formulae $C_8F_{16}O$ and the semi-structural formula $CF_3$—$CF_2$—$CF_2$—$CF_2$—CO—$CF_2$—$CF_2$—$CF_3$, $CF_3$—$CF_2$—$CF_2$—$CF_2$—CO—CF—$(CF_3)_2$ and $(CF_3)_2$—CF—$CF_2$—CO—CF—$(CF_3)_2$, which, more simply, are called C8K below.

The gas that does not form part of the fluoroketone family is preferably selected from gases that present, firstly, a very low boiling temperature, i.e. typically equal to or less than −50° C. at standard pressure, and, secondly, a dielectric strength that is at least equal to the strength presented by carbon dioxide in test conditions (same switchgear, same geometrical configuration, same operating parameters, . . . ) that are strictly identical to those used in order to measure the dielectric strength of said gas.

In addition, it is preferred for the gas to be non-toxic, i.e. not classified among substances considered to be carcinogenic, mutagenic, and/or toxic to reproduction by (EC) Regulation No. 1272/2008 of the European Parliament and of the Council dated 16 Dec. 2008, and, in addition, for it to present a GWP that is low, i.e. typically equal to or less than 500 and, more preferably, equal to or less than 10.

Gases that present this set of properties are for example air, (GWP of 0), nitrogen (GWP of 0), helium (GWP of 0), carbon dioxide (GWP of 1), oxygen (GWP of 0), and nitrous oxide (GWP of 310).

Thus, gaseous media that are suitable for use in the switchgear of the invention may in particular consist of mixtures composed of one or more of the above-mentioned fluoroketones and of one or more gases selected from air, nitrogen, oxygen, helium, carbon dioxide and nitrous oxide for example mixtures such as: C8K/air, C8K/$N_2$, C8K/$O_2$, C8K/$CO_2$, C7K/air, C7K/$N_2$, C7K/$O_2$, C7K/$CO_2$, C6K/air, C6K/$N_2$, C6K/$O_2$, C6K/$CO_2$, C5K/air, C5K/$N_2$, C5K/$O_2$, C5K/$CO_2$, C3K/C8K/air, C3K/C8K/$N_2$, C3K/C8K/$O_2$, C3K/C8/$CO_2$, C3K/C7K/air, C3K/C7K/$N_2$, C3K/C7K/$O_2$, C3K/C7K/$CO_2$, C3K/C6K/air, C3K/C6K/$N_2$, C3K/C6K/$O_2$, C3K/C6K/$CO_2$, C4K/C6K/air, C4K/C6K/$N_2$, C4K/C6K/$O_2$, C4K/C6K/$CO_2$, C5K/C6K/air, C5K/C6K/$N_2$, C5K/C6K/$O_2$, C5K/C6K/$CO_2$, C3K/C5K/C6K/air, C3K/C5K/C6K/$N_2$, C3K/C5K/C6K/$O_2$, C3K/C5K/C6K/$CO_2$, C4K/C5K/C6K/air, C4K/C5K/C6K/$N_2$, C4K/C5K/C6K/$O_2$, C4K/C5K/C6K/$CO_2$, C6K/air/$N_2$, C6K/air/$CO_2$, C6K/air/$N_2O$, C4K/C5K/$N_2$/$O_2$, C4K/C5K/He/$0_2$, C4K/C5K/$CO_2$/$O_2$, C4K/C5K/$N_2O$/$O_2$, C4K/C5K/air/$N_2$, 4K/C5K/air/He, C4K/C5K/air/$CO_2$, C4K/C5K/air/$N_2O$, C4K/C6K/$N_2$/$O_2$, C4K/C6K/He/$O_2$, C4K/C6K/$CO_2$/$O_2$, C4K/C6K/$N_2O$/$O_2$, C4K/C6K/air/$N_2$, C4K/C6K/air/He, C4K/C6K/air/$CO_2$, C4K/C6K/air/$N_2O$, C5K/C6K/$N_2$/$O_2$, C5K/C6K/He/$O_2$, C5K/C6K/$CO_2$/$O_2$, C5K/C6K/$N_2O$/$O_2$, C5K/C6K/air/$N_2$, C5K/C6K/air/He, C5K/C6K/air/$CO_2$, C5K/C6K/air/$N_2O$, etc., it being understood that all combinations between said fluoroketones and said gases may be envisaged.

The overall global warming potential of these mixtures is approximately proportional to the partial pressure of each of their components relative to the volume percentage of each of the components.

Among said gaseous media, those consisting of mixtures of C4K, C5K, C6K, and/or C7K and of one or more gases selected from nitrogen, air, and carbon dioxide are very particularly preferred.

In any event, the fluoroketone or the totality of the fluoroketones present in the gaseous medium represents at least 1% by volume of the total volume of said medium and may reach 100% by volume as a function of the fluoroketone(s) used, of the rated voltage of the switchgear, and of specifications that must be satisfied by said switchgear.

Thus, by way of example, for high-voltage switchgear the volume proportions of fluoroketone(s) lie typically in the range 3% to 40%, while for medium-voltage switchgear they are generally higher, typically in the range 3% to 100%.

Ionization in the plasma state of a fluoroketone leads to the formation of molecular species of smaller molecular mass and, therefore, of smaller size than the fluoroketone. Therefore, the means for absorbing the molecular species that form after the fluoroketone is ionized during an electric arc preferably consist of one or more devices including a solid and porous material capable of absorbing and of retaining in its pores only those molecules that present a size that is less than the molecular size presented by said fluoroketone. Such a material may in particular be activated alumina, or activated carbon, a molecular sieve carbon (MSC), or a zeolite.

The invention also provides a method of manufacturing a switchgear for breaking a medium- or high-voltage electric current as described above, which method includes a step of filling a leaktight enclosure, in which electrical components are found, with at least one fluoroketone, alone or in a mixture with at least one gas that does not form part of the fluoroketone family and that is characterized in that said filling step includes in succession:

forming a partial vacuum in the enclosure;

heating said enclosure to a temperature $\theta_1$ that is greater than a maximum temperature for using the switchgear;

injecting the fluoroketone in the gaseous state into the enclosure until said fluoroketone in said enclosure reaches a pressure lying in the range the saturated vapor pressure it presents at the temperature $\theta_1$ to the saturated vapor pressure it presents at said maximum temperature for using the switchgear;

cooling the enclosure to a temperature $\theta_2$ that is less than said maximum temperature for using the switchgear; and possibly injecting the gas that does not form part of the fluoroketone family into the enclosure until a predetermined total (or absolute) pressure is reached in the enclosure.

The invention can be better understood on reading the additional description given below that relates to an embodiment of switchgear for breaking an electric current using the method of the invention.

Naturally, however, this additional description is given merely by way of illustrative example of the invention and is in no way limiting on said invention.

DETAILED DESCRIPTION OF AN
EMBODIMENT OF SWITCHGEAR OF THE
INVENTION

The present example relates to manufacturing a switchgear that is designed to be used at a temperature that does not exceed 80° C. at its wall and in which provision is made for the electric arcs that are struck to be extinguished by a gaseous medium constituted of C6K and $CO_2$ in a volume ratio of 10/90.

In known manner, this switchgear includes a closed enclosure having a volume of 10 liters (L) and a certain number of electrical components that are housed inside said enclosure. Means suitable for absorbing molecular species that form after ionization of C6K are also housed in said enclosure, e.g. a zeolite of the type marketed by CECA under the name Siliporite™.

In order to fill the enclosure with C6K and $CO_2$, firstly, a vacuum is formed in said enclosure until a residual pressure in the order of 0.1 kPa ($10^{-3}$ bar) is reached in said enclosure.

Next, the enclosure is heated so as to raise its inside temperature to 40° C.

While maintaining the inside temperature at said value, the C6K is injected into the enclosure by pressure difference and until the pressure of the C6K in the enclosure is 73 kPa (0.73 bar), said C6K having already been heated to a temperature greater than its boiling point (49° C. under normal pressure) so that it is in the gaseous state.

Heating of the enclosure is stopped and its inside temperature is allowed to return to 20° C.

The pressure of C6K in the enclosure then falls to 33 kPa (0.33 bar) and, as can be seen in Table 1 below in which the saturated vapor pressure (SVP) values of C6K as a function of temperature are indicated, this corresponds to the SVP presented by said fluoroketone at a temperature of 20° C., with the fraction of fluoroketone corresponding to the remaining 40 kPa thus entering the liquid phase.

$CO_2$ is then injected into the enclosure until a total pressure of 330 kPa (3.3 bar) is obtained in the enclosure.

C6K has a molar volume of 22.4 L/mol at 0° C. and 101.32 kPa (1 atm) and a molecular mass of 316 g/mol. It is therefore possible to determine the mass and the volume of the fraction of C6K that is present in the liquid state in the enclosure, i.e. 53.3 g and 33 mL at 20° C.

At the temperature of 20° C., the switchgear enclosure obtained in this way therefore contains a gaseous medium that is subjected to a total pressure of 330 kPa (3.3 bar), that is constituted of a mixture of C6K and $CO_2$ at a volume ratio of 10/90, and in which the partial pressure of C6K is 33 kPa (0.33 bar), as well as 33 mL of C6K in the liquid state.

This gaseous medium is suitable for use as an electric-arc extinction medium.

When an electric arc is formed, a portion of the fraction of C6K, which is present in the gaseous state inside the enclosure, is broken down into molecular species of smaller molecular mass and, therefore, of smaller size than C6K. This has the effect of raising the total pressure that exists inside the enclosure, while lowering the partial pressure of the C6K to below its SVP.

The molecular species thus formed in this way are trapped by the molecular sieve, and some of the fraction of C6K that is present in the liquid state enters the gaseous phase, and this has the effect of returning the partial pressure of C6K to a value equal to its SVP (i.e. 33 kPa, or 0.33 bar at 20° C.), and the volume ratio C6K/$CO_2$ to its original value.

Using this mechanism, the volume ratio C6K/$CO_2$ can be held stable or quasi-stable, for a given temperature, regardless of the number of breaks performed by the switchgear.

TABLE 1

| Temperature | SVP |
| --- | --- |
| 20° C. | 33 kPa (0.33 bar) |
| 30° C. | 50 kPa (0.50 bar) |
| 40° C. | 73 kPa (0.73 bar) |
| 50° C. | 104 kPa (1.04 bar) |
| 60° C. | 145 kPa (1.45 bar) |
| 70° C. | 197 kPa (1.97 bar) |
| 80° C. | 262 kPa (2.62 bar) |
| 90° C. | 343 kPa (3.43 bar) |
| 100° C. | 442 kPa (4.42 bar) |

GIVEN REFERENCE

[1] Nakauchi et al., International Conference on Gas Discharge and their Applications, China, Sep. 11-15, 2006.

The invention claimed is:
1. A switchgear, comprising a leaktight enclosure comprising electrical components and a gaseous medium, which extinguishes electric arcs likely to occur in the leaktight enclosure, wherein the gaseous medium comprises a fluoroketone or a mixture comprising a fluoroketone and a gas that is not a fluoroketone, wherein the fluoroketone is present in the leaktight enclosure in part in the liquid state and in part in the gaseous state, and wherein the enclosure further comprises an absorber, which absorbs molecular species that form after ionization of the fluoroketone during arcing.

2. The switchgear of claim 1, wherein the fluoroketone comprises a total of 3 to 8 carbon atoms and a ketone function.

3. The switchgear of claim 2, wherein the fluoroketone has a formula of $C_nF_{2n}O$, wherein n is an integer in the range from 3 to 8.

4. The switchgear of claim 3, wherein the fluoroketone has at least one semi-structural formulae selected from the group consisting of $CF_3$—CO—$CF_3$,
$CF_3$—CO—$CF_2$—$CF_3$,
$CF_3$—CO—CF—$(CF_3)_2$,
$CF_3$—$CF_2$—CO—CF—$(CF_3)_2$,
$CF_3$—$CF_2$—$CF_2$—CO—$CF_2$—$CF_2$—$CF_3$,
$CF_3$—$CF_2$—$CF_2$—CO—CF—$(CF_3)_2$,
$(CF_3)_2$—CF—CO—CF—$(CF_3)_2$,
$CF_3$—$CF_2$—$CF_2$—$CF_2$—CO—$CF_2$—$CF_2$—$CF_3$,
$CF_3$—$CF_2$—$CF_2$—$CF_2$—CO—CF—$(CF_3)_2$, and
$(CF_3)_2$—CF—$CF_2$—CO—CF—$(CF_3)_2$.

5. The switchgear of claim 1, wherein the gas, which is not a fluoroketone, is at least one selected from the group consisting of air, nitrogen, oxygen, helium, carbon dioxide, and nitrous oxide.

6. The switchgear of claim 4, wherein the gaseous medium consists of a mixture comprising:

at least one fluoroketone having a semi-structural formulae selected from the group consisting of $CF_3$—CO—$CF_3$,
$CF_3$—CO—$CF_2$—$CF_3$,
$CF_3$—CO—CF—$(CF_3)_2$,
$CF_3$—$CF_2$—CO—CF—$(CF_3)_2$,
$CF_3$—$CF_2$—$CF_2$—CO—$CF_2$—$CF_2$—$CF_3$,
$CF_3$—$CF_2$—$CF_2$—CO—CF—$(CF_3)_2$, and
$(CF_3)_2$—CF—CO—CF—$(CF_3)_2$; and at least one gas selected from the group consisting of nitrogen, air, and carbon dioxide.

7. The switchgear of claim 1, wherein the fluoroketone or the totality of the fluoroketones present in the gaseous medium represents at least 1% by volume of the total volume of the gaseous medium.

8. The switchgear of claim 1, wherein the absorber is a device comprising activated alumina, activated carbon, a molecular sieve carbon, a zeolite, or any combination thereof.

9. The switchgear of claim 1, which is an electrical transformer, an electricity transporting or distributing line, a set of busbars, a circuit breaker, a switch, a disconnector, a unit combining a switch with fuses, a grounding switch, or a contactor.

10. A method of manufacturing the switchgear of claim 1, the method comprising:

filling a leaktight enclosure comprising electrical components, with a fluoroketone or a mixture comprising a fluoroketone and a gas that is not a fluoroketone, wherein the filling comprises, in succession:

forming a partial vacuum in the leaktight enclosure;

heating the leaktight enclosure to a temperature $\theta_1$ that is greater than a maximum temperature for using the switchgear;

injecting the fluoroketone in a gaseous state into the leaktight enclosure until the fluoroketone in the leaktight enclosure reaches a pressure between a saturated vapor pressure it presents at the temperature $\theta_1$ and a saturated vapor pressure it presents at the maximum temperature for using the switchgear;

cooling the leaktight enclosure to a temperature $\theta_2$ that is less than the maximum temperature for using the switchgear; and optionally, injecting the gas that is not a fluoroketone, into the leaktight enclosure until a predetermined total pressure is reached in the leaktight enclosure.

11. The switchgear of claim 1, wherein the gaseous medium comprises $CF_3$—CO—$CF_2$—$CF_3$ and at least one gas selected from the group consisting of nitrogen, air, and carbon dioxide.

12. The switchgear of claim 1, wherein the gaseous medium comprises $CF_3$—CO—CF—$(CF_3)_2$ and at least one gas selected from the group consisting of nitrogen, air, and carbon dioxide.

13. The switchgear of claim 1, wherein the gaseous medium comprises $CF_3$—$CF_2$—CO—CF—$(CF_3)_2$ and at least one gas selected from the group consisting of nitrogen, air, and carbon dioxide.

14. The switchgear of claim 1, wherein the gaseous medium comprises $CF_3$—$CF_2$—$CF_2$—CO—$CF_2$—$CF_2$—$CF_3$ and at least one gas selected from the group consisting of nitrogen, air, and carbon dioxide.

15. The switchgear of claim 1, wherein the gaseous medium comprises $CF_3$—$CF_2$—$CF_2$—CO—CF—$(CF_3)_2$ and at least one gas selected from the group consisting of nitrogen, air, and carbon dioxide.

16. The switchgear of claim 1, wherein the gaseous medium comprises $(CF_3)_2$—CF—CO—CF—$(CF_3)$ and at least one gas selected from the group consisting of nitrogen, air, and carbon dioxide.

17. The switchgear of claim 1, wherein the gaseous medium comprises $CF_3$—$CF_2$—CO—CF—$(CF_3)_2$ and carbon dioxide.

18. The switchgear of claim 1, wherein the gaseous medium consist of a mixture of $CF_3$—$CF_2$—CO—CF—$(CF_3)_2$ and carbon dioxide.

* * * * *